United States Patent [19]

Dammel et al.

[11] 4,123,642

[45] Oct. 31, 1978

[54] APPARATUS FOR INDUCTION HARDENING GEAR TEETH

[75] Inventors: Howard W. Dammel, Cincinnati; Robert M. Frantz, Milford; James H. Luke, Loveland, all of Ohio; William G. Skrzypczyk, Harborcreek, Pa.

[73] Assignees: Cincinnati Steel Treating Company, Cincinnati, Ohio; General Electric Company, Erie, Pa.

[21] Appl. No.: 749,905

[22] Filed: Dec. 13, 1976

Related U.S. Application Data

[62] Division of Ser. No. 608,630, Aug. 28, 1975, Pat. No. 4,026,732.

[51] Int. Cl.² ............................................. H05B 5/08
[52] U.S. Cl. .............................. 219/10.59; 219/10.43; 219/10.79
[58] Field of Search ...................... 219/6.5, 7.5, 10.41, 219/10.43, 10.59, 10.67, 10.69, 10.79; 266/118, 119, 125, 126, 129; 148/147, 149

[56] References Cited

U.S. PATENT DOCUMENTS

| 2,223,970 | 12/1940 | Stansel | 219/10.79 |
| 2,299,934 | 10/1942 | Sherman et al. | 219/10.59 |
| 2,371,459 | 3/1945 | Mittelmann | 219/10.41 |
| 2,426,053 | 8/1947 | Roberds | 219/10.43 |
| 2,428,303 | 9/1947 | Wood | 219/10.59 |

Primary Examiner—Bruce A. Reynolds
Attorney, Agent, or Firm—Wood, Herron & Evans

[57] ABSTRACT

Apparatus for obtaining full tooth width induction hardening of gear teeth. The method comprises attaching gear teeth shaped non-magnetic material templates to the opposite sides of the gears in close proximity to but spaced from the sides of the gear teeth. The gear teeth are then progressively induction hardened by passing a current intensifier between the aligned teeth of the templates and the gears while maintaining current flow to the intensifier for the full width of travel of the intensifier between the gear teeth. In the preferred embodiment the faces and roots of the templates are slightly undersize relative to the faces and roots of the gear teeth and the tops of the teeth of the template are slightly oversize and extend beyond the tips of the teeth of the gear.

5 Claims, 5 Drawing Figures

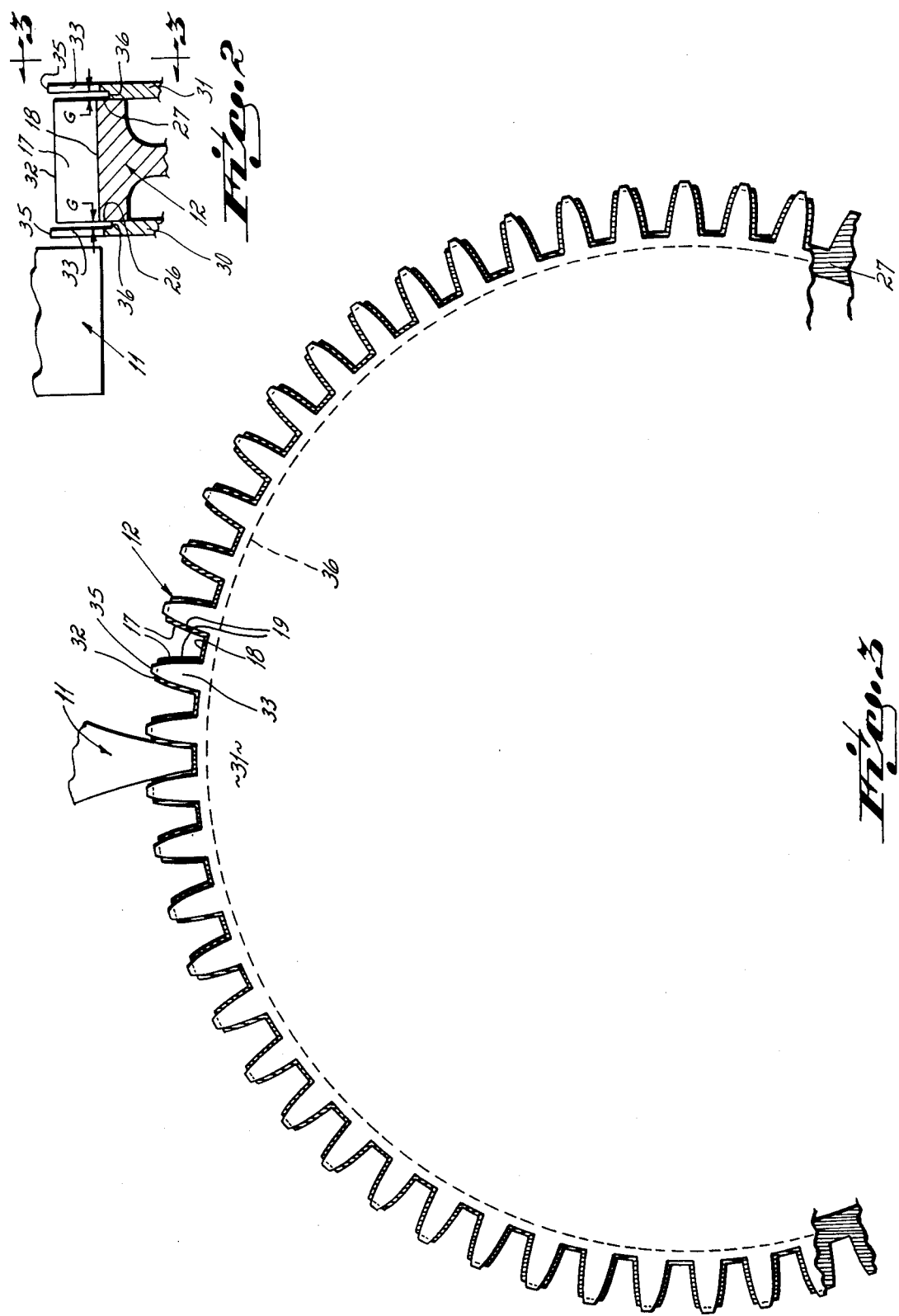

APPARATUS FOR INDUCTION HARDENING GEAR TEETH

This is a division of application Ser. No. 608,630, filed Aug. 28, 1975, now U.S. Pat. No. 4,026,732.

The present invention relates to an improved method and apparatus for progressively induction hardening metal workpieces.

This invention is particularly applicable to progressive induction hardening of opposed working surfaces of adjacent gear teeth and it will be described with particular reference thereto; however, it is to be appreciated that the invention has broader applications and may be used for progressively heat treating various shaped objects or workpieces.

The present invention is directed to an improved method and apparatus adapted to be used in association with and as an improvement upon conventional machines and processes for hardening the opposed working surfaces of adjacent gear teeth by progressively heating and immediately thereafter quenching those surfaces.

One common method of hardening gear teeth comprises passing a generally V-shaped current intensifier between the working surfaces of opposed gear teeth of a gear in close proximity but non-contacting relationship to the working surfaces while the intensifier is electrically energized by a suitable power source. As the current intensifier passes through the space between the adjacent gear teeth, the surfaces of these teeth are progressively heated and then immediately quenched by a liquid medium so as to effect hardening of the working surfaces.

As the process of progressive induction heat treating gear teeth is presently practiced, current flow to the current intensifier is initiated prior to the flux concentrating core of the intensifier reaching the leading edge of the gear teeth and the current is turned off before the leading edge of the intensifier core passes the trailing edge of the gear teeth. This power cycle to the intensifier avoids overheating or "burning" of the edges of the gear teeth. As an incident to this power cycle to the intensifier though the side edges of the gear teeth remain untreated or unhardened.

It is often desirable to obtain face-to-face full width hardening of gear teeth by progressive induction hardening as described hereinabove. This desirable characteristic, if achieved, results in greater tooth strength than is the case if less than the full width of the tooth is hardened. Additionally, the full width hardening results in increased working surface area and consequently increased gear life because of the increased hardened working surface of the tooth.

We are aware that there have been numerous prior attempts to achieve face-to-face full width induction hardening of gear teeth. One such attempt of which we are aware involved the controlled and varied current flow to the intensifier when the intensifier was located adjacent the edges of the gear teeth. This attempt, as well as all others of which we are aware, have failed though to solve the problem of obtaining full width induction hardening of the gear teeth, primarily because these attempts resulted in overheating and burning of the edges of the teeth.

It has therefore been a primary objective of this invention to provide an improved method and apparatus for progressive induction heat treating gear teeth which enables heat treatment of the work surfaces of the gear teeth to be effective for the full width of the gear teeth and without overheating the edges of the teeth as the inductor enters and leaves the space between the teeth.

We have discovered, and this invention is predicated upon, the discovery of an improved method for progressively induction hardening gear teeth which enables the full width of the gear teeth to be evenly hardened without overheating or burning the edges of the teeth. Specifically, we have discovered that if a gear tooth shaped, low electrical resistance template, such as a copper or aluminum template, is affixed to the opposite sides of the gear and is maintained a predetermined distance from the faces of the gear teeth, the current intensifier may be passed between the gear teeth in the conventional manner with full current flow to the intensifier for the full width of the gear teeth and achieve even heating and hardening of the gear teeth for the full width of the teeth.

In a preferred practice of the invention, a pair of gear tooth shaped templates are made from an electrically conductive plate of copper or aluminum approximately ⅛ inch in thickness. These plates are attached to the opposite sides of the gear but are spaced approximately 0.015 inches from the sides of the gear teeth. We have found that the spacing is critical and must be maintained in the range from approximately 0.015 inches to 0.025 inches.

In the preferred embodiment, the gear tooth shaped template has approximately the same peripheral configuration as the gear teeth of the gear to which the template is to be affixed for induction hardening of the teeth, except that the template gear teeth are preferably slightly undersize, as for example 0.020 inches undersize along the faces and root of the template teeth. This undersizing of the template teeth enables the template to be easily attached to the sides of the gear in a manner such that the template does not interfere with passage of the intensifier between the working surfaces of the gear teeth. Additionally, in the preferred embodiment the template teeth extend beyond the tips of the gear teeth or are slightly oversized at the tip so as to effect better hardening of the tips of the gear teeth.

We have found that when templates as described hereinabove are attached to the opposite faces of the gear teeth and the gear teeth are otherwise induction hardened in the conventional manner, that the process results in even depth, full width induction hardening of the gear teeth. Furthermore, we have found that the practice of this improved process eliminates any need to chamfer the edges of the gear teeth to avoid burning of the edges. Elimination of the chamfering results in one less machining step in the manufacture of the gear and consequently reduces the cost of manufacturing the gear.

These and other objects and advantages of the invention will be more apparent from the following description of the drawings in which:

FIG. 2 is a cross sectional view through a portion of the gear and intensifier of FIG. 1.

FIG. 5 is a view similar to FIG. 4 but illustrating the results of induction hardening gear teeth with the practice of the invention of this application.

Figure 1:
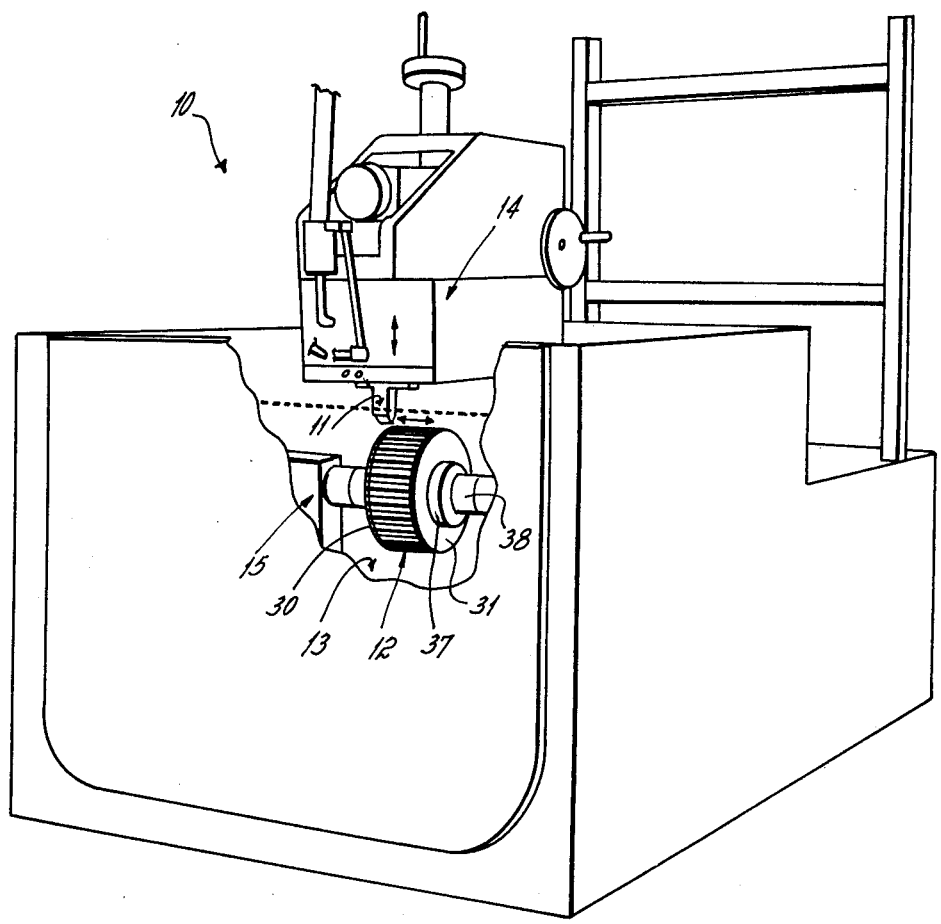
FIG. 1 is a perspective view, partially broken away, of one form of machine used in the practice of the invention of this application.

Referring to FIG. 1, there is illustrated an induction gear hardening machine 10 of the type which may be used in the practice of the invention of this application. This machine utilizes a submerged current intensifier 11 to effect induction hardening of faces and roots of the teeth of a gear workpiece 12. The machine includes a quench tank 13 and a filtered quench recirculating system (not shown), a scanning head 14 upon which the intensifier 11 is mounted, a work holding fixture 15 and an automatic index mechanism (not shown) for effecting indexing of the workpiece 12. In operation, the machine 10 is completely automatic after the workpiece has been loaded. The submerged working surfaces of faces 17 and roots 18 of adjacent teeth 19 of the gear 12 are heated upon movement of the intensifier 11 between the teeth of the gear 12. After each pass is completed the gear 12 is automatically indexed one tooth pitch to locate the next pair of gear teeth in alignment with the intensifier so that the next adjacent tooth is hardened upon return of the intensifier along the path previously traveled in hardening the previous faces 17. This cycle is repeated automatically until every tooth has been hardened.

Conventionally, the scanning speed of the machine 10 in both directions, the length of the scanning stroke, and the timing of the electrical power on and off are automatically controlled by adjustable dogs and limit switches. Similarly, the filling and lowering of the liquid level in the quench tank is automatically controlled as is the temperature of the liquid within the quench tank.

The machine heretofore described forms no part of the invention of the application. Such machines are commercially available and one such preferred machine is manufactured and sold by National Automatic Tool Co., Inc. of Richmond, Indiana. A more detailed description of this type of machine may be found in U.S. Pat. No. 3,502,312 which issued on Mar. 24, 1970. The intensifier 11 also forms no part of the invention of this application. Accordingly, it has not been illustrated and is not described in detail herein. A more detailed description of an intensifier suitable for use in the practice of this invention may be found in U.S. Pat. No. 2,810,054, which issued on Oct. 15, 1957.

Figure 4:
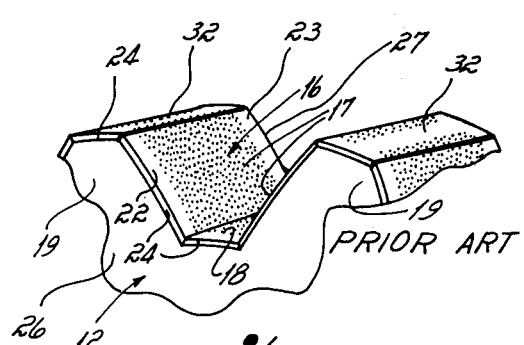
FIG. 4 is a perspective view of a portion of a gear illustrating the results of progressively induction hardening a pair of gear teeth without the practice of the invention of this application.

Prior to this invention the general practice in the use of machines of the type illustrated in FIG. 1 was to turn on the electrical power and the flow of electrical current through the intensifier 11 before the core of the intensifier had entered between the teeth of the gear 12 and to turn off that power flow just as the leading edge of the core of the intensifier reached the trailing edge of the gear teeth. This practice resulted in the hardening of the opposed faces 17 of the gear teeth and of the root 18 for less than the complete width of the gear teeth, but it also avoided overheating or "burning" of the edges of the gear teeth. This less than full width hardening of the gear tooth is illustrated in FIG. 4 where the hardened surface is shaded and identified by the numeral 16. Consequently, the conventional practice of progressively induction hardening gear teeth prior to this invention resulted in a band 22, 23 of unhardened material adjacent the leading and trailing side edges 26, 27 of the gear teeth. To further lessen the possibility of burning or overheating the edges of the teeth, the side edges were also generally chamfered as indicated at 24 in FIG. 4.

The invention of this application enables the full width of the gear tooth to be induction hardened as illustrated in FIG. 5. In this figure, that portion of the gear teeth which has been induction hardened by the practice of this invention has been shaded and is indicated by the numeral 25.

In order to achieve this full width hardening of the faces, roots and tip of gear 12, the invention of this application utilizes two templates 30, 31 made from non-magnetic material and attached to but spaced a critical distance from the opposite faces 26, 27 of the teeth of the gear 12 during the induction hardening process. Preferably, these plates are made from either aluminum or copper. As best illustrated in FIGS. 2 and 3 these templates 30, 31 comprise gear shaped plates approximately ⅛ inch in thickness and having teeth formed on the periphery thereof which conform generally to the peripheral contour of the gear 12 to which the plates are attached during the induction hardeneing process.

The plates 30, 31 may be contoured to exactly follow the peripheral contour of the gear 12. In the preferred embodiment though, the teeth of the plates are undersized by 0.020 inches on the faces and roots of the teeth of the template relative to the teeth of the gear. At the tips, the teeth of the template are oversize or extend beyond the tips 32 of the teeth of the gear by approximately 0.020 inches. If the teeth of the template are identical in peripheral contour to the gear teeth, the template must be very exactly positioned relative to the gear during the hardening process in order to avoid interference of the template with the intensifier because of there being only a very small clearance between the intensifier and the gear teeth as the intensifier is moved between the teeth. By undersizing the faces and roots of the teeth of the template relative to the teeth of the gear, the positioning of the template relative to the gear during the hardening process is far less critical. We have found that extension of the tip 35 of the template beyond the tip 32 of the gear by a small amount, as for example, 0.020 inches, better enables the induction hardening to be carried out to the tip 32 for the full width of the gear. Since the undersizing of the teeth of the template 33 relative to the sizing of the teeth of the gear is only provided to facilitate mounting of the template on the gear without interference between the template and intensifier the degree of undersizing is not critical to the practice of this invention so long as it does not exceed approximately 0.030 inches, at which point the template does not have the requisite effect upon the induction hardening pattern of the gear teeth.

Figure 3:
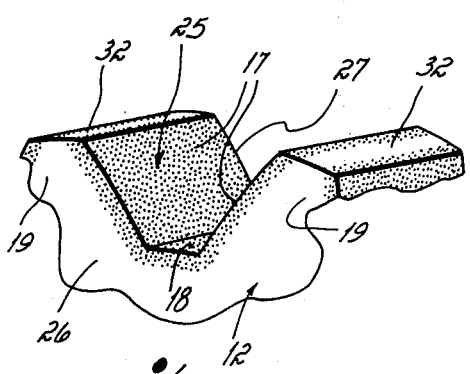
FIG. 3 is a side elevational view taken generally on line 3—3 of FIG. 2 and illustrating the positioning of a template in accordance with the practice of the invention of this application.

Referring still to FIGS. 2 and 3 it will be seen that there is a gap or clearance space G between the template tooth 33 and the side faces 26, 27 of the gear teeth. In the preferred embodiment, this gap G is approximately 0.015 inches but may be in the range of approximately 0.015 inches to 0.025 inches. The gap G is achieved in the illustrated embodiment by undercutting the templates 30, 31 from an annular line 36 on the inside surface of the template outwardly to the tips of the teeth on the template. This undercutting of the inside face of the template by approximately 0.015 inches causes the templates 30, 31, when attached to one side 26, 27 of the gear, to automatically establish or set up the proper gap or clearance between the template and the sides of the gear.

In the practice of the invention of this application, the templates 30, 31 are attached to the opposite faces 26, 27 of the gear 12 by any conventional connector, as for example, by rings 37 (FIG. 1) threaded onto opposite sides of the gear supporting arbor 38. The arbor and arbor supported gear 12 are then mounted upon the indexable work holding fixture 15 of the machine. After proper location of the gear 12 relative to the intensifier 11, the intensifier 11 is passed laterally between opposed faces of adjacent gear teeth while electrical current flows through the intensifier 11 so as to induce current flow and consequent heating of the opposed faces 17 and root 18 of adjacent teeth 19 of the gear. This lateral movement of the intensifier 11 is sequentially repeated back and forth between the teeth of the gear 12 as the gear is automatically indexed one pitch diameter after each pass of the intensifier between the gear teeth until all of the teeth have been hardened.

In the practice of the invention of this application full electrical power to the intensifier is turned on and full current flows in the intensifier as the flux concentrating core of the intensifier enters between the teeth of the template such that the leading edge 26 or 27 of the gear is subjected to full current flow. Full current flow is then maintained to the intensifier as the intensifier passes between the gear teeth until the leading edge of the flux concentrating core of the intensifier is approximately flush with the trailing or exiting edge 26 or 27 of the gear. At that point the power to the intensifier is turned off. This timing of the power on and power off cycle to the intensifier is approximately the same as is the practice for achieving the less than full width hardened pattern of FIG. 4 in the absence of the templates. As a result of the presence of the templates 30, 31 though on the opposite faces of the gear, the gear teeth are induction hardened for the full width without any overheating or "burning" of the edges of the gear teeth.

The practice of the invention also has the advantage of eliminating the need to chamfer the gears prior to induction hardening as has heretofore been required to avoid burning of those edges. In many applications the cost of carrying out the process of this invention can be justified by elimination of the chamfering process even if there is no need for the additional gear teeth strength provided by the full width hardening of the gear teeth effected by the invention of this application.

While we have described only one preferred embodiment of this invention persons skilled in the art to which it pertains will appreciate numerous changes and modifications which may be made without departing from the spirit of our invention. Therefore, we do not intend to be limited except by the scope of the following appended claims.

Having described our invention we claim:

1. In combination, a machine for induction hardening oppositely facing working surfaces of adjacent teeth of a gear and a template for use with said machine, said machine including an electrical current intensifier movable between adjacent teeth of a gear while electrical current is flowing in said intensifier so that an electrical current is induced to flow through the opposed working surfaces of the teeth to effect heating of said working surfaces, said template having at least a peripheral portion in close proximity to but spaced from one side of the gear teeth, said template being in the form of a plate made from a low electrical resistance material, said plate having a peripheral contour similar to the peripheral contour of the gear teeth and having teeth formed thereon, the sides and roots of said teeth of said plate being undersized and spaced inwardly from the sides and roots of said gear teeth when said template is positioned for induction hardening said working surfaces of said gear teeth.

2. The template of claim 1 in which the tips of said teeth of said plate are oversize and extend beyond the tips of said gear teeth when said template is located in close proximity to said gear teeth during induction hardening of oppositely facing working surfaces of adjacent gear teeth.

3. The template of claim 2 in which the tips of said teeth of said plate are oversize and extend approximately 0.020 inches beyond the tips of said gear teeth when said template is located in close proximity to said gear teeth during induction hardening of oppositely facing working surface of adjacent gear teeth.

4. The template of claim 1 in which said sides and roots of said teeth of said plate are undersized by approximately 0.020 inches relative to the sides and roots of said gear teeth when said template is located in close proximity to said gear teeth during induction hardening of oppositely facing working surfaces of adjacent gear teeth.

5. The template of claim 1 which includes means formed on one side of said plate to effect spacing of between approximately 0.015 and 0.025 inches between said gear teeth and said teeth of said plate when said template is placed in close proximity to said one side of said gear teeth.

* * * * *